US006515252B1

(12) United States Patent
Girold

(10) Patent No.: US 6,515,252 B1
(45) Date of Patent: Feb. 4, 2003

(54) PLASMA TORCH CARTRIDGE AND PLASMA TORCH EQUIPPED THEREWITH

(75) Inventor: Christophe Girold, Piolenc (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/958,680

(22) PCT Filed: Apr. 11, 2000

(86) PCT No.: PCT/FR00/00920

§ 371 (c)(1), (2), (4) Date: Oct. 12, 2001

(87) PCT Pub. No.: WO00/62584

PCT Pub. Date: Oct. 19, 2000

(30) Foreign Application Priority Data

Apr. 14, 1999 (FR) ........................................ 99 04646

(51) Int. Cl.[7] ........................................ B23K 10/00

(52) U.S. Cl. ................ 219/121.48; 219/75; 219/121.5; 219/121.51; 313/231.41

(58) Field of Search ...................... 219/121.48, 121.49, 219/121.5, 121.51, 121.52, 121.36, 75; 313/231.31, 231.41

(56) References Cited

U.S. PATENT DOCUMENTS

| | | | | |
|---|---|---|---|---|
| 4,967,055 A | * 10/1990 | Raney et al. | ............ | 219/121.5 |
| 5,258,599 A | * 11/1993 | Moerke | ................. | 219/121.48 |
| 6,163,008 A | * 12/2000 | Roberts | ................. | 219/121.48 |

FOREIGN PATENT DOCUMENTS

| | | |
|---|---|---|
| EP | 0002623 | 6/1979 |
| FR | 2153020 | 4/1973 |
| GB | 1463711 | 2/1977 |
| JP | 04249096 | 9/1992 |
| WO | WO 9208335 | 5/1992 |

* cited by examiner

*Primary Examiner*—Mark Paschall
(74) *Attorney, Agent, or Firm*—Thelen Reid & Priest LLP; Robert E. Krebs

(57) ABSTRACT

The invention concerns a plasma torch comprising an interchangeable cartridge (100) consisting of six components only: an electroplating copper anode nozzle (1); an electroplating cathode support (2); a doped tungsten cathode (3); a plastic cathode diffusing-centring device (4); a plastic assembling device (5); a ceramic insert (6). Said components are assembled by pressing and the assembly of the components form volumes (71, 72, 73) constituting the anode cooling circuit and the plasma forming gas intake conduits (127, 44). The intake and discharge of fluid are provided by a connecting and maintaining structure designed for the easy mounting of the cartridge (100).

21 Claims, 7 Drawing Sheets

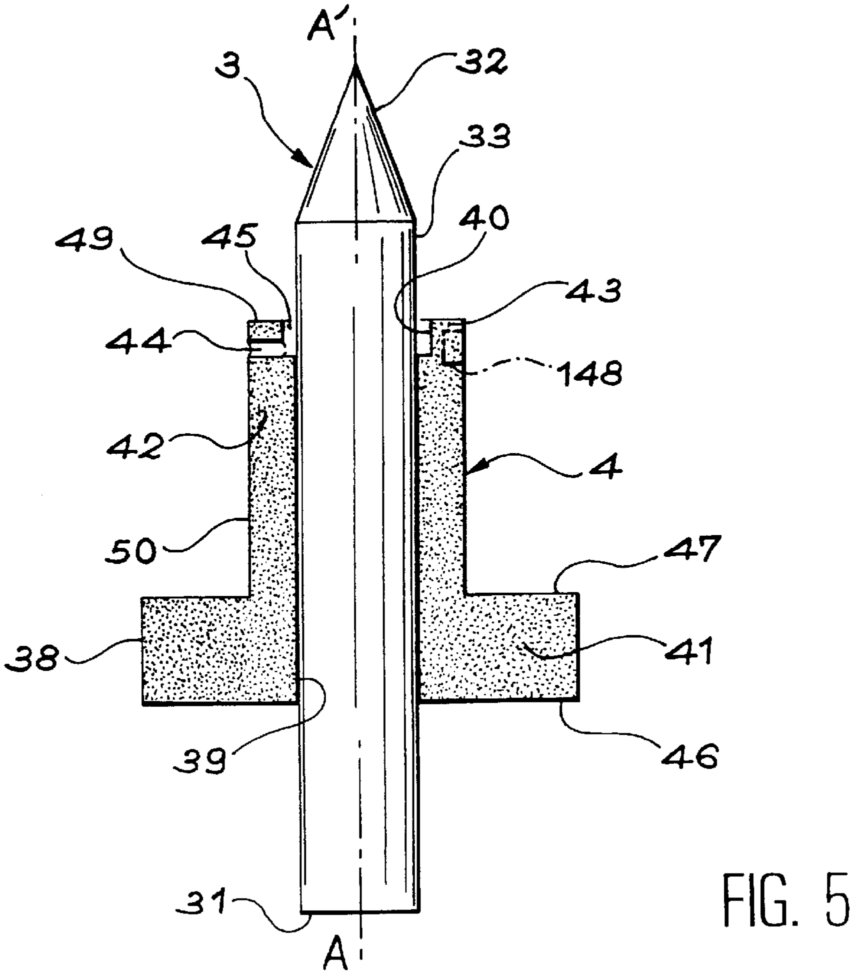
FIG. 5
FIG. 6
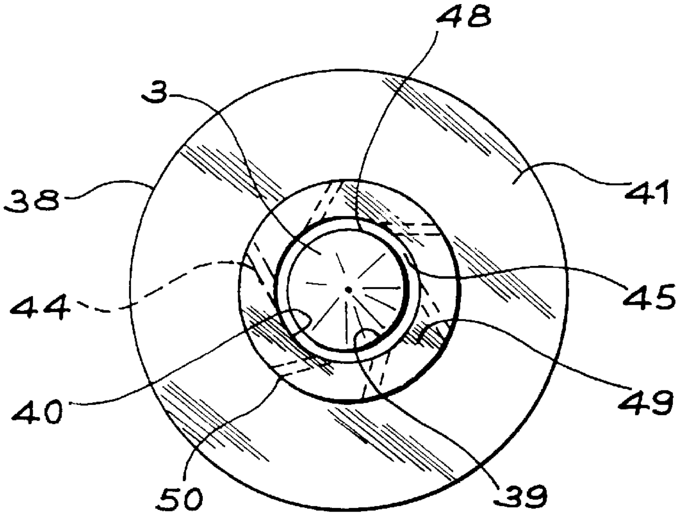

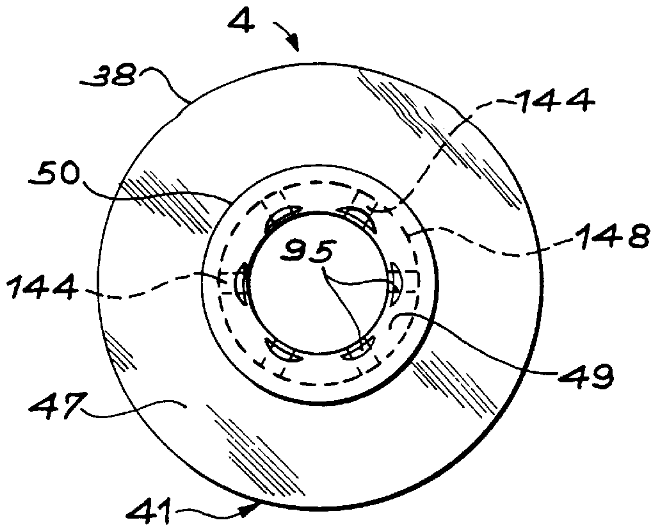
FIG. 7
FIG. 10
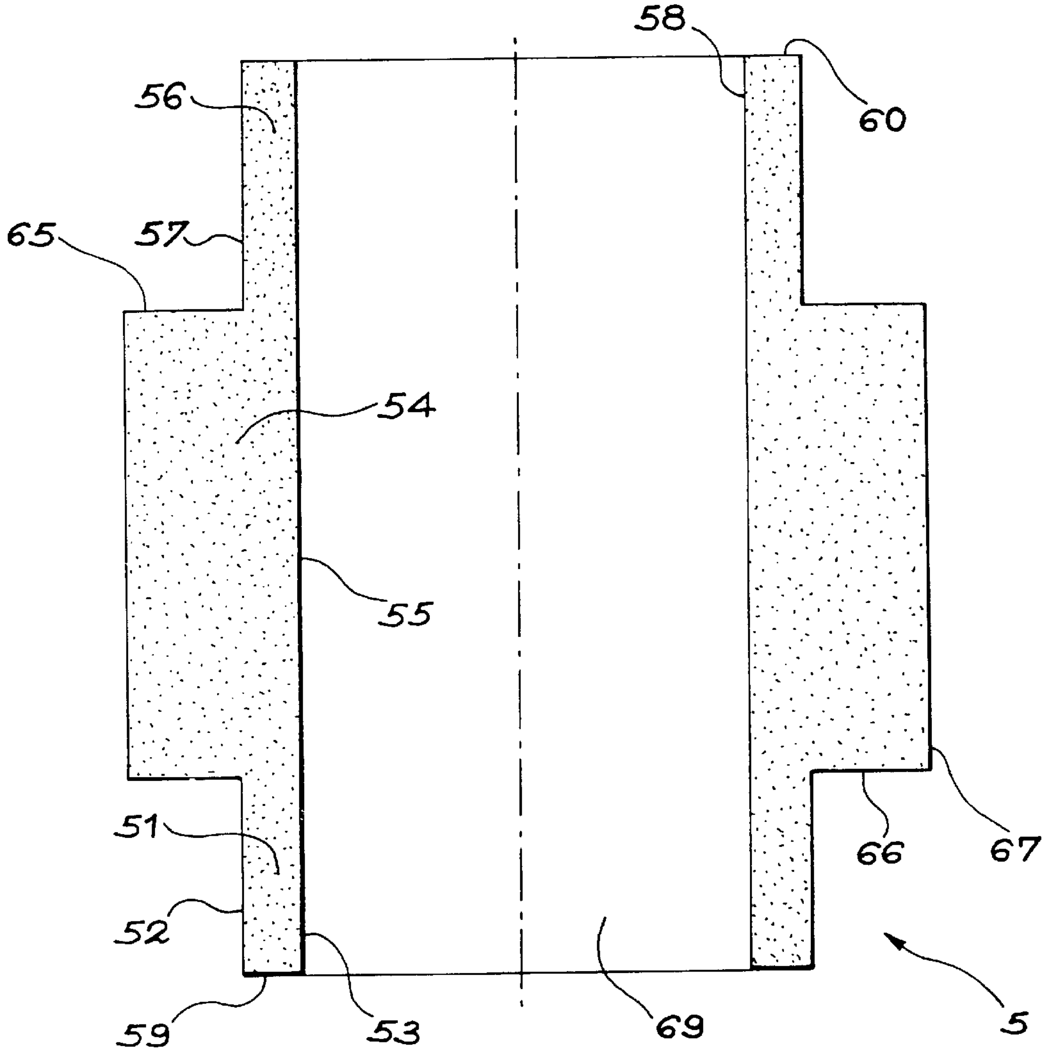

PLASMA TORCH CARTRIDGE AND PLASMA TORCH EQUIPPED THEREWITH

"This application is a national phase of PCT/FR00/00920 which was filed on Apr. 11, 2000, and was not published in English."

FIELD OF THE INVENTION

The invention is located in the field of plasma torches.

PRIOR ART

Arc plasmas belong to the family of thermic plasmas. They are partially ionised gaseous media, conductive of electricity but by and large electrically neutral, at pressures in the region of atmospheric pressure. They are generated by means of a plasma torch, by passing one or more plasmagene gases through an electric arc which is maintained between two electrodes.

To bring gases to a high temperature and high specific enthalpy, blown arc torches are used. This means that the arc is confined to the inside of the torch containing the two electrodes and it is the high speed jet of high temperature gas (the plasma) which is used in the process.

FIG. 1 shows in a very diagrammatic way the principle of such a torch. A torch of this kind includes two electrodes, an anode 1 and a cathode 3, concentric with each other and providing between them a gas circulation channel 7.

The two electrodes 1, 3 are connected to a high voltage, high frequency (HV-HF) generator and to a direct current generator. They must of necessity be energy cooled (by water circulation) to prevent their fusion.

Initially and by means of the HV-HF generator, an electric arc 8 flashes between the two electrodes (cathode and anode) ionising the gas introduced and making the inter electrode space conductive. The direct current generator may then issue into this space and maintain the arc.

The power supplied to the torch is equal to the product of the strength (which can be regulated) of the voltage established between the anode and the cathode. This voltage is dependent on several parameters such as the type and flow of gas used, but also, to a not insignificant degree, on the wear and tear on the electrodes. The power of the plasma 9 is equal to the power supplied to the torch minus the losses in the cooling water. Wear and tear on the electrodes puts them therefore at a serious disadvantage. It depends on their geometry, their cooling efficiency, their coaxiality, and on the type and purity of the gases.

Equipment allowing an arc 8 plasma 9 to be generated is used for thermal spraying (surface treatment), gas heating or chemical synthesis. The energy supplied to the gas(es) by the electric arc allows them to be heated to temperatures above 10,000 K.

The choice of plasmagene gas or gases is almost unlimited. It is a function of the demands of the process (oxidation, nitridation, high temperature in a reduction medium, etc.). The power range is very extensive, running from a few kilowatts to several megawatts. Very often, the potential operational range is dictated by the type and flow of the plasmagene gases selected.

A torch is therefore often designed for a given application since its technology must be compatible with the choice of plasmagene gas and the desired work power.

Its size, its form and its simplicity can also become important if it is required to work in a cramped or hostile environment.

Torches currently in existence are complex units, including at least about ten parts (excluding seals, screws and fluid connectors). The coaxiality of the electrodes depends on the stack of manufactured parts with acceptable tolerances for the seals.

Replacing one or both electrodes is an operation which has to be performed regularly (in most cases after some ten hours in operation). This operation always requires sub-units to be dismantled/re-assembled and the seals to be changed.

To illustrate this, three examples of known plasma torches will now be briefly described.

A first known torch operates with an air/argon or oxygen/argon mix, its power is about 100 kW. It consists of 15 manufactured parts, 21 seals, 22 screws and 6 fluid connectors. The parts subject to regular wear are the cathode and the anode, an insulation bush and an injection nozzle. Minimum maintenance (changing the anode) is required at less than 100 hours of operation in the best conditions of use.

A second known torch has been developed for the hydropyrolysis of heavy hydrocarbons. The plasmagene gases are argon and hydrogen, which are mixed with methane at the torch output. This torch is similar to a thermal spray gun. It has, excluding the fluid feed connectors and the screws, 10 manufactured parts and 7 O-rings.

As a third example may be cited one of the simplest torches, marketed by the company SULZER METCO. This is the thermal spray gun F4-MB. This type of torch operates conventionally with argon, helium and nitrogen singly or in a mixture. Hydrogen is often added to gain power (increase in peak arc voltage). There are nevertheless 8 manufactured parts, 14 O-rings, 12 screw components and 3 fluid connectors.

Japanese patent application JP 04-249 096 describes a plasma torch wherein, in order to reduce the probability of creating an arc between the anode and the cathode, the plasmagene gases follow a path which allows them to eddy. To this end, a centring device 10*a*, which is a part placed between the anode and the cathode, has an opening 106, which goes from the top face of the centring device to a lateral face. Another conduit 102 located between the anode and the centring device part 10 allows the gases coming from the conduit 106 to be guided to the bottom of the anode.

Conduits 107 join the outside of the centring device 10 to a central cavity 105 of the latter. This particularity allows an eddying jet of plasmagene gas to be created. A more even wear of the cathode is thus obtained.

BRIEF DESCRIPTION OF THE INVENTION

The purpose of the torch, according to the invention, is as far as possible to simplify the assembly of the torch itself and, on the other hand, the replacement from time to time of worn out parts. It has been developed in particular for a gas heating application in a pyrolysis gas postcombustion reactor for chlorinated radioactive waste, heavily contaminated by alpha emitters. This reactor is intended to operate in a glove box.

In a hostile environment (radioactive, being compelled to work in a glove box or in the remote manipulator), the work must be simplified as far as possible. The standard exchange of sub-units is often preferable to the dismantling and to the re-assembly of isolated parts in a complex unit. The intervention time is shorter, the reliability of a new and inspected sub-unit is much better than that of a dismantled and re-assembled complex unit.

To this end, the plasma torch according to the invention is designed in two parts, a disposable interchangeable cartridge constituting a plasma generator intended to be inserted into a cartridge connecting and holding structure. The purpose of this cartridge connecting and holding structure is to connect the cartridge to its supplies of plasmagene gas, cooling fluid and electrical currents. This structure comprises to this end first cartridge connection means.

These first means serve as intermediaries for the supplies of electrical currents, water and gas. These supplies are therefore completely dissociated from the plasma cartridge.

The structure comprises second means engaging or not engaging with cartridge fixing means so as to keep the cartridge mechanically connected to the first means of supplying electrical currents, water and gas.

The invention relates to a cartridge generating plasma for a plasma torch, having, centered on an axis AA', an annular anode comprising a central cavity receiving a cathode centered on AA', the anode and the cathode providing between them an annular space for producing an arc, plasmagene gas distribution means, the distributed gas circulating in the annular space between the cathode and the anode, anode cooling means, comprising particularly conduits for an anode cooling fluid, these conduits having an inlet and an outlet, assembly means, a cartridge characterized in that the plasmagene gas distribution means in the annular cavity formed between the cathode and the anode comprise conduits formed in a central ring of the anode surrounding the central cavity of the anode, a first end of these conduits emerging in the central cavity of the anode, a centering device of the cathode, this centering device having a cylindrical part having a central cavity passed through by the cathode, and tightened on the cathode, this cylindrical part having a lateral outer surface one part at least of which is tightened in the central cavity of the anode, and having an upper surface, the centering device comprising conduits bringing the upper surface of the centering device into communication with a part of the lateral outer surface of the centering device located within the central cavity of the anode, these conduits having a first end in the lateral outer surface of the centering device and second end in the upper surface of the centering device, the conduits of the centering device being in communication with the conduits of the anode.

In this way the plasmagene gas circuit is made with a single auxiliary part, the centering device, by a simple operation carried out under pressure to push along an axial direction a centering device tightened on the cathode in the axial cavity of the anode. With the tightening of the centering device in the anode and on the cathode assembly of the anode, cathode unit is completed. This assembly of the anode on the cathode constitutes moreover a part of the plasmagene gas distribution circuit. In the preferred embodiment continuity and regularity of gas distribution is ensured given that the relay between the centering device conduits and the gas inflow conduits through the anode is provided by an annular distribution volume. The annular distribution volume is constituted, by a radial groove, which may be located either on the anode, or on the centering device, or again both on the anode and on the centering device. In this way the cartridge according to the invention does not require to supply gas any joint or conduit, other than those made by piercing or machining or molding, in the parts required for the torch to operate. As far as assembly is concerned, using a connecting groove between the centering device conduits and the gas inflow conduits through the anode, simplifies assembly since it is not then necessary to index angularly the anode and the centering device.

The plasmagene gases received in the first ends of the conduits of the centering device are distributed around the cathode, by means of several holes emerging in the upper surface of the upper part of the centering device, i.e. in apertures or in a final gas distribution groove.

In the preferred embodiment, where the cathode is carried by a support comprising anode positioning means, an annular cooling volume provided between an assembler and the anode receives a cooling fluid through a conduit bringing the fluid from an outer surface of the cartridge but preferentially from the anode to this annular volume. The assembler, the annular anode and the support comprise hollow parts in the form of annular grooves and projecting parts in the form of annular rings all centered parallel to the axis AA', the projecting parts being fitted tightly into the hollow parts. The annular volume seal is obtained by the fact that the outer diameter of each projecting ring has a value slightly greater than that of the groove into which it is fitted. In this way the cartridge according to the invention requires in respect of water supply no joint or conduit other than those made by piercing or machining or molding in the parts necessary for the torch to operate. The assembler or assembler body is so called since apart from its function of forming the annular volume around the anode, in which the cooling fluid passes, it also has a cartridge mechanical assembly function. It contributes to the cathode support and anode assembly.

In the preferred embodiment, which will be described below, the assembler is a part made of an electrically insulating material comprising a coaxial lower ring and upper ring. The lower ring is fixed in a support groove, the upper ring is fixed in an anode groove. This anode groove is peripheral to an anode ring. This anode ring houses the central cavity of the anode. In this embodiment the inner radial dimensions of the assembler are greater over at least one axially central part than that of the anode ring housing the central cavity. An annular volume for the circulation of an anode cooling fluid is thus provided between this anode ring and the assembler. This volume is in communication with inlet and outlet conduits of the cooling fluid, by means of conduits bored in the anode, the assembler, or again the support.

Other advantages and benefits of the invention will emerge from the description of a preferred embodiment and of embodiment variants, which will now be described in relation to the appended drawings.

BRIEF DESCRIPTION OF THE DRAWINGS

FIG. 5 shows an axial cross-section of a cathode centering device and a cathode assembled with this centering device;

FIG. 6 shows a view from above of the centering device and of the cathode shown in FIG. 5;

FIG. 7 shows a view from above of a centering device variant and of the cathode shown in FIG. 5;

FIG. 10 shows an axial cross-section of an assembler;

DESCRIPTION OF A PREFERRED EMBODIMENT

Figure 2:
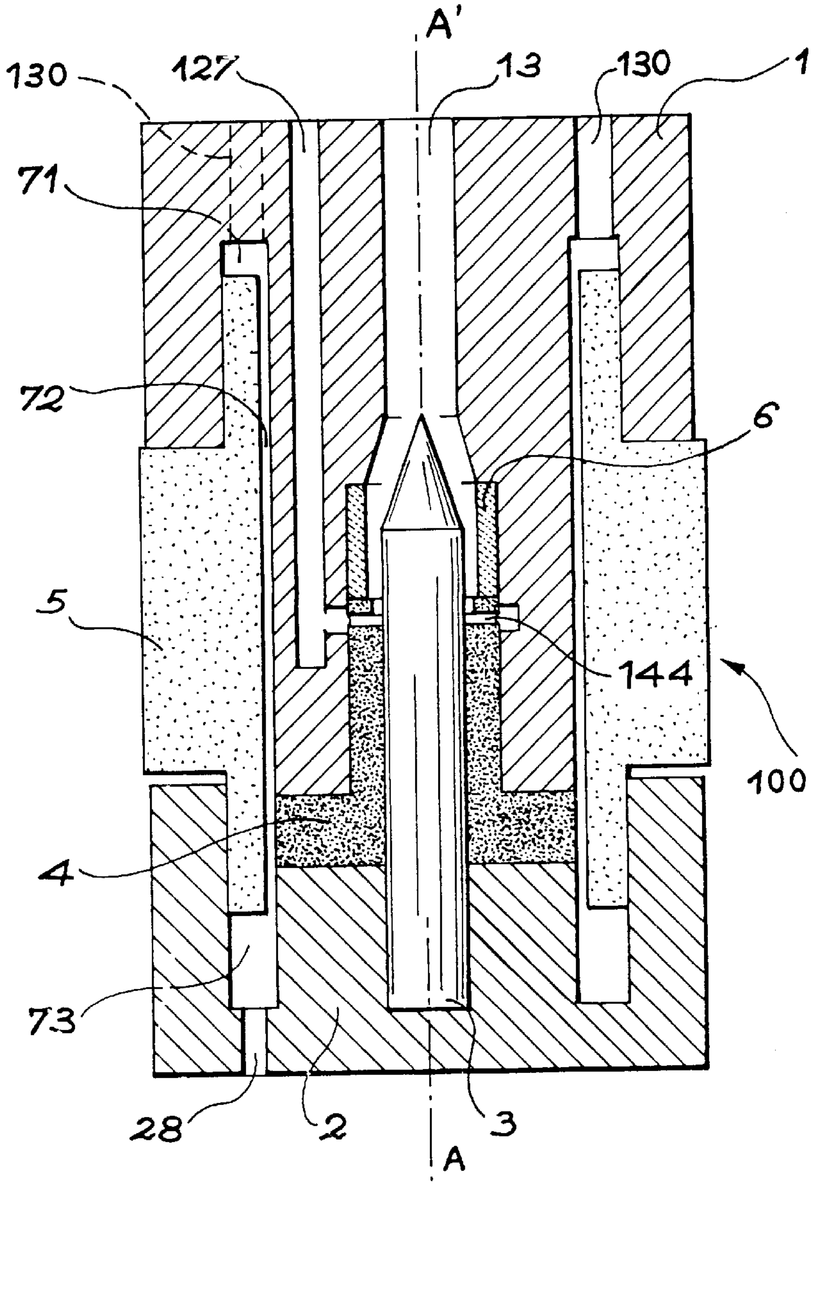
FIG. 2 shows an axial cross-section of a cartridge assembled according to the invention.

A cartridge example 100 according to the invention will now be described in conjunction with FIG. 2. In this embodiment example, the cartridge 100, and the parts of which it consists, have forms with a symmetry of revolution around an axis AA' constituting the axis of the cartridge.

The parts, which, when assembled, together constitute a cartridge 100 according to the invention, are 6 in number. These are:

- an anode nozzle made of electrolytic copper 1
- a cathode support made of electrolytic copper 2
- a doped tungsten cathode 3
- a cathode centering diffuser device made of plastic material 4
- an assembler made of plastic material 5
- a ceramic insert 6.
- an assembler made of plastic material 5
- a ceramic insert 6.

Figure 1:
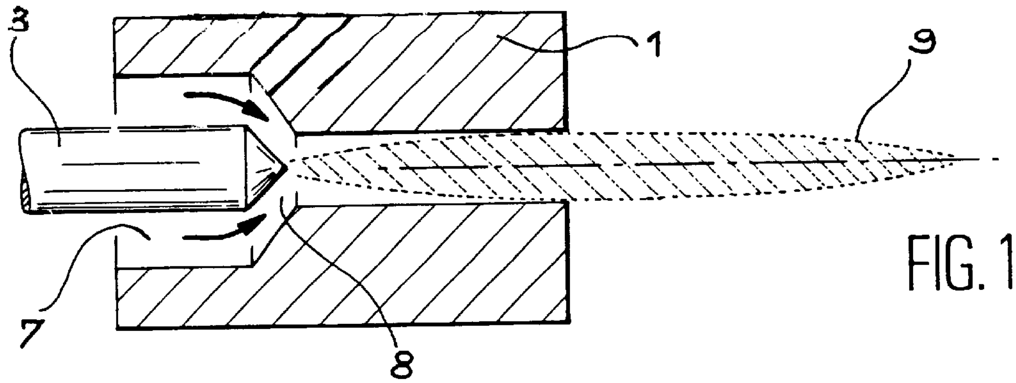
FIG. 1, already commented upon shows the principle of a plasma torch.

When they are assembled, parts 1 to 6 provide between them in a known way and as shown in FIG. 1, a gas circulation channel 7, an inter electrode space where an arc 8 can be created. The plasma 9, (not shown in FIG. 2), is ejected by a nozzle 13 of the anode 1.

Each of these parts and their mode of assembly will now be described.

Figure 3:
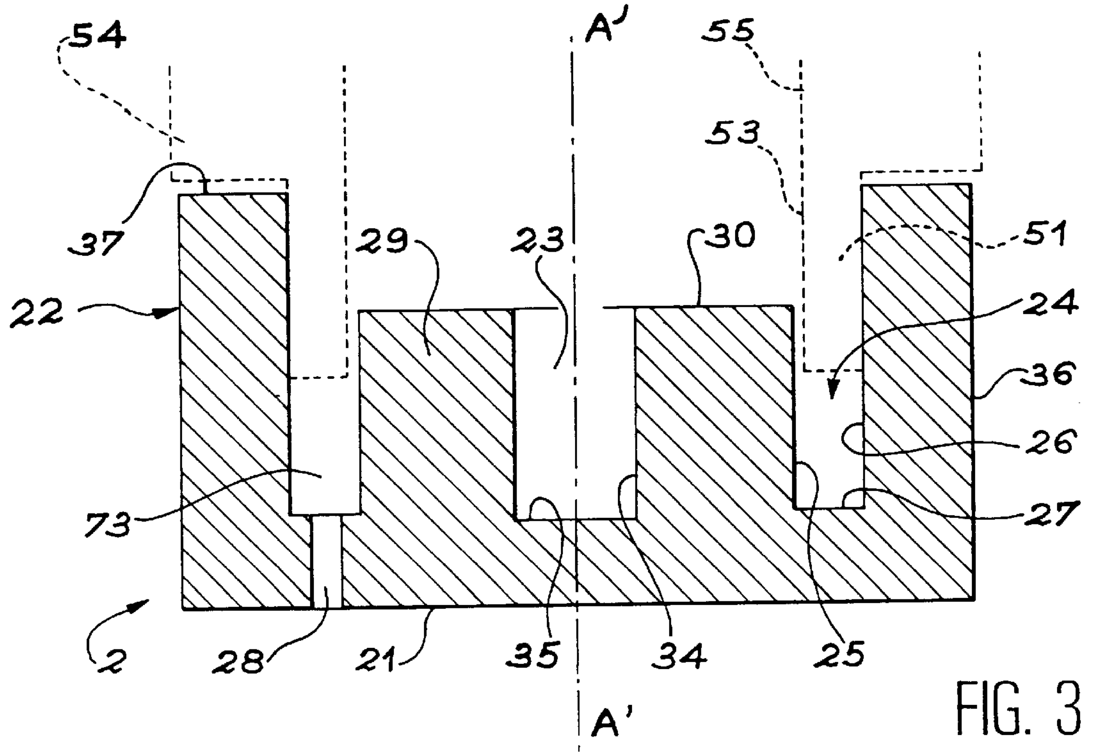
FIG. 3 shows an axial cross-section of a cathode support and a lower part of an assembler assembled with this support.
Figure 4:
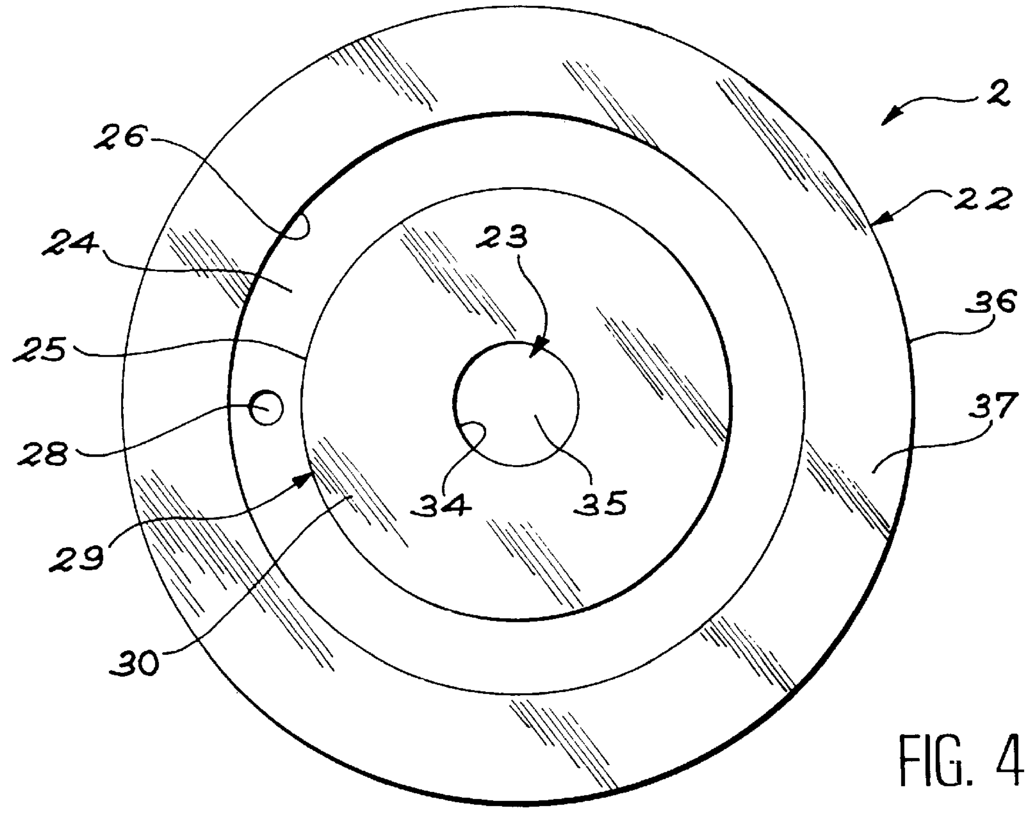
FIG. 4 shows a view from above of the support shown in FIG. 3.

The cathode support 2 described below, in conjunction with FIGS. 3 and 4, is a part cylindrical in shape having a symmetry of revolution around the axis AA'. It comprises a base or lower surface 21 circular in shape located in a plane perpendicular to the axis AA'. The side opposite to the base 21 comprises, from the center to the periphery, a central bore 23, with a lateral surface 34 and a bottom 35, a groove 24 circular in revolution around AA', having two lateral edges 25, 26, an inner edge 25 and an outer edge 26, and a bottom 27. One or more through holes 28 join the bottom 27 of the groove 24 to the base 21. Between the groove 24 and the bore 23, the support 2 comprises a ring 29,having an upper surface 30 located in a plane parallel to the base 21. The lateral edges of this ring are constituted by the inner lateral edge 25 of the groove 24 and the lateral face 34 of the bore 23. Lastly, the support 2 comprises a peripheral ring 22 having a lateral outer face 36 equal in diameter to that of the base 21 and an upper face 37. The lateral edges of the ring 22 are constituted by the lateral outer face 36 of the support 2 and by the lateral outer face 26 of the groove 24.

As far as the dimensions are concerned, the diameter of the bore 23 is enough to receive in tight fit the cathode 3, which will be described later thus ensuring good electrical contact between the cathode and the support. The width of the groove 24, i.e. the difference between the radii of the outer 26 and inner 25 edges is greater than the width (i.e. the difference between the ring outer radius and inner radius) of a first ring 51 of the assembler 5. On the other hand, the diameter of the outer wall 26 of the groove 24 is less than the outer diameter of this ring 51 of the assembler 5 in such a way that this ring 51 of the assembler 5 can be fitted tightly into the groove 24. The assembler 5 the assembly ring 51 of which is shown in FIG. 3 are described below.

The cathode 3 and the centering device 4 will now be described with reference to FIGS. 5 and 6 wherein these parts appear in the assembled position.

The cathode 3 is cylindrical in shape with a flat circular base 31 and with a conical head 32. It is included in a cathode centering device 4, shown in FIGS. 5 and 6 in position around the cathode 3.

The centering device 4 is also circular of revolution in shape around AA'. It comprises a cylindrical base part 41, extended by a cylindrical part 42 of smaller outer diameter. The inner diameter of the centering device 4 is constant over the whole height of the centering device with the exception, in a first embodiment variant, of the diameter of an upper end part 43 located on the side opposite the base 41, the diameter of which is slightly greater than the inner diameter of the base 41 and of the cylindrical extension 42.

The plane surfaces of the centering device 4 perpendicular to the axis AA' are constituted by the lower 46 and upper 47 surfaces of the base part 41 of the centering device 4. The lower surface 46 of the base 41 is delimited by two concentric circles, the diameter of the inner circle being equal to the inner diameter of the centering device 4, the outer diameter of this lower surface 46 being equal to the outer diameter of the base part 41. The upper surface 47 of the base part 41 of the centering device 4 is delimited by two concentric circles, the diameter of the outer circle is equal to the outer diameter of the base part 41 and the diameter of the inner circle is equal to the outer diameter of the extension 42 of the centering device 4. The plane surfaces of the centering device 4 perpendicular to the axis AA' also comprise, in the embodiment mentioned above, the bottom 48 of a groove 45 and lastly the upper surface 49 of the centering device 4.

The bottom 45 of the groove 45 is delimited by an outer circle, the diameter of which is equal to the inner diameter of an end part 43 and by an inner circle, the diameter of which is equal to the outer diameter of the cathode 3.

Lastly, the inner axial surface of the centering device 4 is constituted by a lower surface 39 corresponding to the parts 41 and 42 the diameter of which is slightly less than the diameter of the cathode 3, and in the embodiment with groove 45, by an upper surface 40, corresponding to the part 43 the diameter of which is greater than the diameter of the cathode 3. The lateral outer surfaces of the centering device 4 are 2 in number, a lateral lower surface 38 corresponding to the base 41 and a lateral upper surface 50 corresponding to the parts 42, and 43 in the version with groove 45.

As far as the dimensions are concerned, the inner diameter of the centering device 4 is, as shown above, slightly less than the outer diameter of the cathode 3, in such a way that this cathode 3 can be fixed tightly in the centering device 4. The inner diameter of the end part 43 is, in the version with groove 45, greater than the diameter of the cathode 3, in such a way that the cathode 3 and the end part 43 together form the groove 45.

Variants of this centering device 4 will now be described in conjunction with FIGS. 5 and 7. The function of the centering device 4 is to center and to insulate electrically the cathode 3 relative to the anode 1. This function is provided by the lateral outer surface 50 of the upper part 42, which, as will be seen below during the description of the assembled cartridge 100, acts as support on a bore of the anode. The variants, which will be described below, relate to the function of the centering device relative to the distribution of plasmagene gas in a fully distributed way in the annular volume between the anode 1 and the cathode 3.

In a first variant shown comprising two variants shown in views from above in FIGS. 6 and 7, the centering device 4 comprises several conduits 44. In the preferred embodiment these conduits 44 shown in FIG. 6 join the outer face 50 to the upper surface 49 of the centering device 4, on which they emerge in apertures 95 shown in FIG. 7, or in the version with groove in the bottom 48 of the groove 45 (FIG. 6). In this preferred embodiment the axes of the conduits 44 are inclined on the axis AA', but not included in a plane containing the axis AA', so as to cause a tangential injection of gases, inducing an eddy called a vortex which will force the arc foot to turn in the anode so as not to remain hooked at a preferential point. The advantage of this embodiment variant is to distribute wear of the cathode evenly around the cathode and therefore to increase its longevity. Conversely it causes a plasma eddy, which is not always desirable as a function of the use of the plasma. This is why, in a second variant, conduits 144 are bored along an axial direction located in a radial plane (FIG. 7). They each emerge in an aperture 95, or, in the version with groove 45, in the groove 45.

In the embodiment variants which have just been described the ends of the conduits 44 or 144 located on the lateral outer surface 50 of the centering device 4 may emerge either directly on the lateral surface 50, which is the preferred mode, or in a radial groove 148 channeled from this lateral surface 50. This groove is shown in dotted lines in FIGS. 5 and 7.

Tightness is obtained by the fact that the centering device is fixed sufficiently tightly in the annular cavity 10 of the anode 1 which will now be described. The anode 1 and its ceramic insert 6 will now be described in conjunction with FIGS. 8 and 9.

The anode 1 and its ceramic insert 6 will now be described in conjunction with FIGS. 8 and 9.

The anode 1 is also a revolution part around the axis AA'. It comprises a central cavity 10 of axis AA'. This cavity is a through cavity and extends axially from an upper face 11 of the anode to a part 134 of a lower face 12 of the anode 1. The lower face 12 of the anode is located opposite the upper face 11 and consists of several parts located axially at different levels. From the upper face 11 to the part 134 of the lower face 12, the cavity 10 comprises a cylindrical upper part 13 forming a nozzle for the plasma. Next there is a truncated cone-shaped part 14. The diameter of the upper part of the part 14 is equal to the diameter of the part 13. The diameter of the lower part of the truncated cone-shaped part 14 is greater than that of the part 13. Lastly, there is a cylindrical lower part 15 extending axially from the lower base 16 of the truncated cone-shaped part 14 to the part 134 of the lower face 12 of the anode 1. The diameter of this part 15 of the cavity 10 is greater than the largest diameter of the truncated cone-shaped part 14. The truncated cone-shaped 14 and cylindrical 15 parts are connected by a plane 17. The ceramic insert 6 is housed in the cavity 10, in the top of the part 15. This simple part will now be described before continuing the description of the anode 1. The insert 6 is a torus shaped bush, generated by a rectangle in rotation around the axis AA'. The width of the rectangle is equal to the width of the plane 17. This width of the plane 17 itself results from the difference between the radius of the lower part 15 and the radius of the lower base 16 of the truncated cone-shaped part 14.

This insert 6 is inserted in such a way that its upper surface 61 acts in support on the plane 17 of the a node 1. The lateral outer surface 62 of the insert is n support on the lateral surface 18 of the part 15 of he cavity 10 of the anode 1.

The outside of the anode 1 includes the upper face 11 delimited by two circles. The diameter of the outer circle is preferably equal to the outer diameter of the support 2, the diameter of the inner circle of the upper surface 11 is equal to the diameter of the upper part 13 of the cavity 10. The outside of the anode 1 also includes a cylindrical outer face 19. The lower face 12 includes several parts located axially at different levels. From the outside towards the axis AA' is found in sequence a first ring 121. The outer diameter of this ring 121 is equal to the diameter of the peripheral cylinder 19. The inner diameter of this ring 121 is preferably equal to the outer diameter of the outer wall 26 of the groove 24 of the support 2. The lower surface 133 of this ring is a plane surface perpendicular to the axis AA'. The lower surface 133 is a part of the lower surface 12 of the anode 1.

Next is found a groove 122. This groove has a groove bottom surface 124. This surface 124 is a part of the lower surface 12 of the anode 1. This grove 122 has a cylindrical outer wall 126 the diameter of which is equal to the inner diameter of the first ring 121. This diameter is preferably equal to the diameter of the outer wall 26 of the groove 24 of the support 2. The inner diameter of the axial groove 122 is preferably equal to the diameter of the cylindrical inner wall 25 of the groove 24 of the support 2.

Lastly a second ring 123 is found. This ring 123 has a lower surface 134, perpendicular to the axis AA'. This lower surface 134 is a part of the lower surface 12 of the anode 1. The ring 123 has a cylindrical outer wall 125 one part of which constitutes the cylindrical inner wall of the groove 122.

The cylindrical wall 125 has a diameter preferably equal to the inner diameter of the wall 25 of the groove 24 of the support 2.

One or preferably several first conduits 127 each having two ends 128, 129 bored in the anode 1 allow a fluid to pass from one of the outer walls 11, 19 of the anode 1, to the inner wall 18 of the cavity 10. In the example shown in conjunction with FIGS. 8 and 9, each conduit 127 leads from its first end 128, in the upper surface 11 to its second end 129 located in the wall 18 of the lower part 15 of the cavity 10. It emerges in this cavity 10 at an axial level located under the insert 6. This conduit or these conduits 127 are provided for the distribution of plasmagene gas.

According to a variant mentioned above in conjunction with the description of the centering device 4 and of its variants, this conduit or these conduits can alternatively emerge in a radial annular groove 135 channeled out of the lateral surface 18 of the cavity 10 of the anode 1, instead of emerging directly on this surface 18. In the preferred embodiment shown in FIGS. 8 and 9 the conduit or conduits 127 are parallel to the axis AA', they are located in the ring 123 concealing the central cavity 10, and they emerge in the groove 135.

One or more second conduits 130 each having two ends 131, 132 lead(s) from one of the outer walls 11, 19 of the anode 1 to the groove 122. In the example shown in conjunction with FIGS. 8 and 9, the conduit 130 has its first end 131 in the peripheral cylinder 19 and its second end 132 emerges in the groove 122 in the bottom 124 of this groove.

The mode of assembly and the assembly of parts 1–6, which together constitute a cartridge 100 for a plasma torch according to the invention, will now be described in conjunction with FIGS. 2, 3, 5 and 8.

First of all, the assembler 5 will be described in conjunction with FIGS. 3, 8 and 10.

Figure 8:
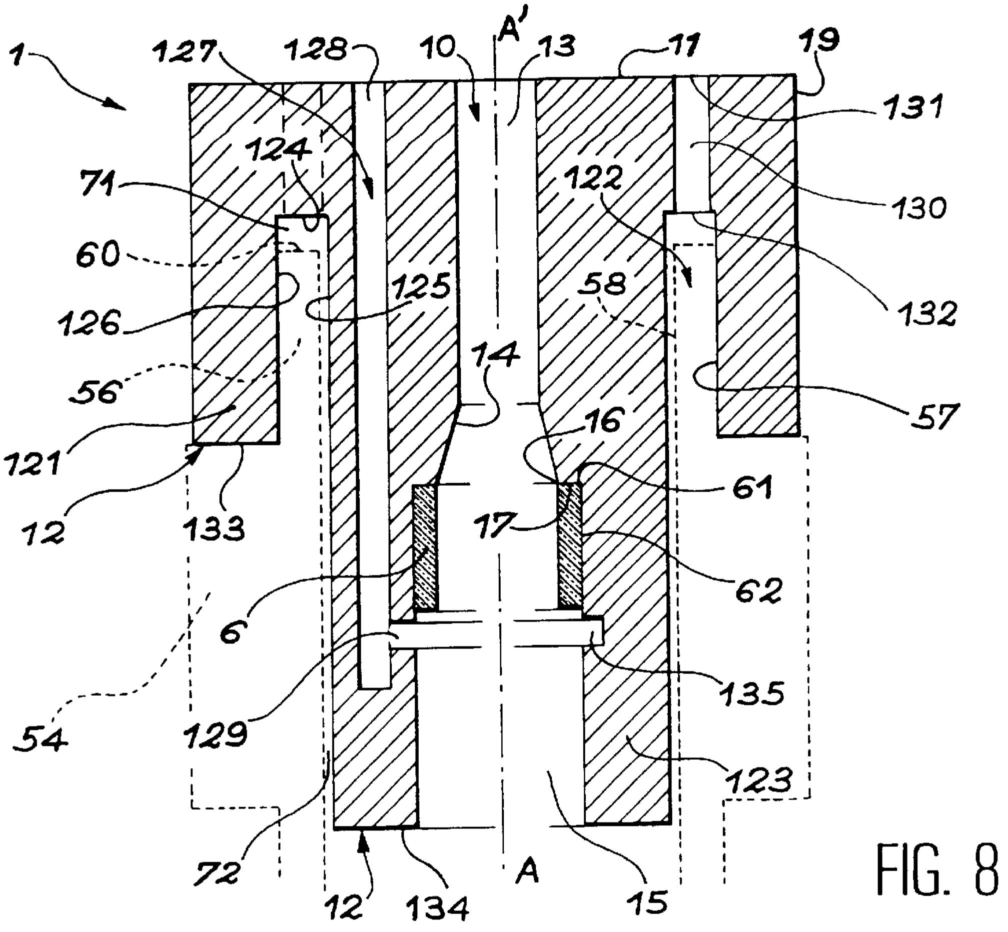
FIG. 8 shows an axial cross-section of an anode, of an insert assembled on this anode and of an upper part of an assembler assembled with this anode.
Figure 9:
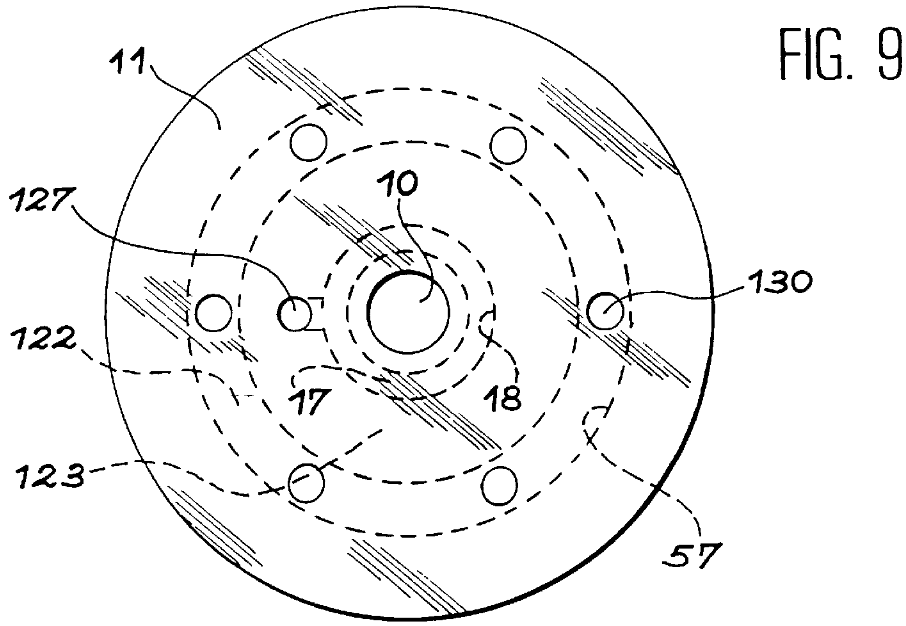
FIG. 9 shows a view from above of the anode and of the insert shown in FIG. 8.

In FIGS. 3 and 8 the lower and upper parts of the assembler 5 have been shown so as to show this assembler 5 in position relative to the support 2 (FIG. 3) and to the anode 1 (FIG. 8) respectively.

The assembler 5 is shown in axial cross-section in FIG. 10.

The assembler 5 comprises a lower cylindrical ring 51. The diameter of the cylindrical outer surface 52 of this ring 51 is slightly greater than the diameter of the wall 26 of the groove 24 of the support 2, such that this ring 51 can be fixed in tight assembly into this groove 24. The diameter of the inner wall 53 of this ring 51 is greater than the diameter of the inner wall 25 of the groove 24 of the support 2. In this way an annular axial volume 77 is provided between these two walls 24, 53. The ring 51 has a lower surface 59. In the assembled position this surface 59 is not in contact with the surface 27 of the bottom of the groove 24. In this way an annular volume 73 is provided between these two surfaces.

This ring 51 is extended by a central part 54 also ring shaped. The diameter of the inner wall 55 of this ring 54 is greater than the diameter of the cylindrical wall 125 of the anode 1. In this way an annular axial volume 72 is provided between these two walls 55, 125. It should be remembered that the wall 125 extends axially from the bottom 124 of the groove 122 of the anode 1 to the lower surface 134 of the second ring 123 of the anode 1. This lower surface 134 constitutes the lowest surface of the anode 1.

The upper part of the assembler 5 shown in the assembled position in FIG. 8 is also in the shape of a ring 56. The diameter of the outer wall 57 of this ring is greater than the outer diameter of the outer wall 126 of the groove 122 of the anode 1. The difference in size between the diameter of the outer wall 57 of the ring 56 and the diameter of the wall 126 is such that this ring 56 can be fixed in tight assembly in the groove 122.

The diameter of the inner wall 58 of the ring 56 is greater than the diameter of the wall 125 of the anode 1. In this way an annular axial volume 76 is provided between these two walls 58, 125. It should be remembered that this wall 125 of the anode 1 extends axially from the bottom 124 of the groove 122 to the part 134 of the lower surface 12 of the anode 1, which is located at the lowest level of the anode. The ring 56 has an upper surface 60. In the assembled position this surface 60 is not in contact with the surface 124 of the bottom of the groove 122. In this way an annular volume is provided between these two surfaces.

The central part of the assembler 5 has an upper surface 65, a lower surface 66 both perpendicular to the axis AA', and a lateral outer surface 67.

The upper surface 65 of the central part 54 of the assembler 5 is delimited by a circle, the diameter of which is the outer diameter of the ring 56 and a circle, the diameter of which is the diameter of the lateral outer surface 67 of the central part 54.

Likewise, the lower surface 66 of the central part 54 of the assembler 5 is delimited by a circle, the diameter of which is the outer diameter of the lower ring 51 and a circle, the diameter of which is the diameter of the lateral outer surface 67.

The circles delimiting the upper 65 and lower 66 surfaces are concentric. In the example shown in the figures the inner diameter of the central axial cavity 69 is constant in such a way that the inner axial surfaces 58, 55, 53 of this cavity form only a single and same surface.

To sum up, the assembler 5 is presented as a revolution part having a central through axial cavity 69. It comprises a central part 54 from which cylindrical parts 56, 51, of outer diameter smaller than the outer diameter of the central part 54, shoot upwards and downwards respectively. In this embodiment the upper 65 and lower 66 surfaces act as assembly stops. The lower surface 133 of the ring 121 of the anode 1 acts as a stop on the upper surface 65 of the central part 54. The upper surface 37 of the ring 22 of the support 2 of the cathode 3 acts as a stop on the lower surface 66 of the central part 54. By means of these stops and of an adapted dimensioning of the grooves 122 and 24 and the axial lengths of the rings 56, 51 it is possible to be sure of providing the annular spaces 71 and 73.

Torch assembly will now be described.

The insert 6 is placed in position as described above in the anode 1. The cathode 3 is inserted into the bore 23 of the support 2, the lower face 31 of the cathode coming into contact with the bottom 35 of the bore 23, the lateral face of the cathode being in contact, by means of tight assembly, with the lateral surface 34 of the bore 23. In this way an electrical contact between the cathode 3 and the support 2 is provided over all the surfaces in relation to the support 2 and the cathode 3. The centring device 4 is placed around the cathode 3 as described above. The lower face 46 of the centring device 4 is in contact with the upper face 30 of the ring 29. The assembler 5 is then put in position under pressure, the groove 122 of the anode 1 receiving the ring 56 of the assembler 5. The upper part of the ring 56 and/or the edges of the groove 122 may be bevelled or chamfered to facilitate insertion. When the assembler 5 is in place the lower surface 133 of the ring 121 of the anode 1 is stopped against the upper surface 65 of the central part 54 of the assembler 5. The upper surface 60 of the assembler 5 is not at the bottom of the groove 122, which means that an annular volume 71 is, as already indicated above, provided between the lower surface 124 of the groove 122 of the anode 1 and the upper surface 60 of the ring 56. The anode 1 and its insert 6 thus assembled with the assembler 5 is then assembled with the support unit 2, cathode 3 and centring device 4, the ring 51 inserting itself under pressure in the groove 24 of the support 2. To facilitate insertion, the bottom of the ring 51 and the top of the grove 24 may be bevelled or chamfered. When the fixing operation is finished, a functional play subsists as shown in an exaggerated way in FIG. 2, between the lower surface 66 of the central part 54 of the assembler 5 and the upper face 37 of the ring 22 of the support 2. The lower surface 59 of the ring 51 of the assembler 5 is not in contact with the groove bottom 27 of the groove 24, an annular volume 73 is therefore, as already indicated above, provided between the lower surfaces 59 of the ring 51 and 27 of the support 2. It will be seen later that this annular volume 73 provided between these two surfaces is intended to collect the cooling water.

As a torch, the operation is the usual operation of a torch, but the cooling water inflow circuit and the plasmagene gas circuit will now be commented upon. It should be remembered that, in the example shown, the inner walls 53 of the lower ring 51, 55 of the central part 54 and 58 of the upper ring 56 of the assembler 5 are aligned. The outer diameter of the ring 123 of the anode 1, the diameter of the lateral outer surface 38 of the centering device 4 and the diameter of the inner wall of the groove 24 of the support 2 are equal such that the walls 125 of the anode 1, 38 of the centering device 4, and 25 of the support 2 are aligned. It should also be remembered that the inner diameter of the assembler 5 is greater than the diameter of the walls 125, 38 and 35 in such a way that an annular volume 72 is provided between the assembler 5 and these walls. This annular volume 72 extends axially from the upper part 60 of the ring 56 to the lower part 59 of the ring 51 of the assembler 5. The water is brought via the opening 131, and through the conduit 130 onto the outer surface of the anode 1, the inner end 132 of the conduit 130 emerges in the annular volume 71 provided between the surfaces 124 and 60 of the groove 122 and of the ring 56 respectively. This water may flow along the inner wall 125 of the anode 1 through the annular volume 72 to the annular volume 73 provided between the bottom of the annular ring 51 and the bottom 27 of the groove 24. This water flows via the conduit or conduits 28 provided in the bottom of the annular groove 24. It can thus be seen that the water circuit is provided without a tightness seal internal to the torch, by means of the tight assembly of the rings 51 and 56 in the grooves 24 and 122 respectively. Naturally the water inflows and outflows could be placed differently, the important thing being that a water circulation cools a ring of the anode 1.

Likewise, the inflow of plasmagene gas via the opening 128 in the anode 1 occurs without a seal, the gas emerging via the conduits 44 or 144 in the openings 95 arranged around the cathode 3 on the centering device 4, or in the groove 45, according to the embodiment variants. Communication between the conduits 127 of the anode 1 and the conduits 44 or 144 of the centering device 4 is achieved by means of the groove 135 of the anode or 148 of the centering device 4. The radial grooves 135 and 148 may also coexist. The torch assembled according to the invention therefore includes only six parts, the anode 1, the support 2, the cathode 3, the centering device 4, the assembler 5 and the insert 6. This torch can be assembled with fewer operations under pressure if specialist tools are available for lateral holding of the parts to be assembled.

With regard to the functions of the different parts making up the assembled cartridge 100 it will be observed that if the cathode 3 is sufficiently tight in the bore 23 of the support 2, the support 2, the cathode 3, the centering device 4, the part 42 of which is tight in the cavity 10 of the anode 1, and the anode 1 form an assembled unit. In these conditions the assembler 5 engaged with the grooves 24 of the support 2 and 122 of the anode may be considered merely as a part of the water circuit. It will also be seen later that the cartridge 100 assembly may be consolidated by mounting the cartridge 100 in position in the holding and connecting structure.

It will also be observed that if the cartridge 100 is as simple as it is, this stems from the overall architecture of the cartridge. Thus the plasmagene gas circuit is in its entirety in a central part of the assembled cartridge 100, the central part of the anode 1, in the shape of a ring 123, this ring immediately adjoining the central cavity 10 of the anode. As for the water circuit, this is at the periphery of this same ring 123 adjoining the central cavity 10 in such a way that there is no crossing of water or gas circuits.

It should be pointed out that the assembler has been presented as a distinct part of the support. This is due to the fact that the assembler, which joins the support made of a conductive material in contact with the cathode, is in contact with the anode. It is therefore made of an electrically insulating material to avoid a short circuit between the anode and the cathode. It is obviously possible to make the support of an insulating material comprising feed-through conductors to connect the cathode. In this case it may be considered that the assembler is constituted of the parts made of insulating material, and the support by the parts made of conductive material.

A few remarks relating to the materials of the components of the cartridge 100 will now be made.

The anode 1 and the cathode support 2 which, in the embodiment example, are made of electrolytic copper could be made of any material, for example metal, electrically conductive and allowing the drainage of very high thermal flows.

The doped tungsten of the cathode 3 could be manufactured in any metal material having a low electron extraction potential.

The centering diffuser device 4 may be manufactured in any plastic material fitting assembly requirements and having good resistance to bulking in water, a strong dielectric character and good mechanical resistance to radiation and to temperature.

The assembler body 5 may be manufactured in a plastic material fitting the requirements of assembly by simple plastic pressure.

The insulating insert 6 may be manufactured in a ceramic material having good resistance to thermal shocks, to radiation and having a strong dielectric character, for example boron nitride.

It has been seen that the assemblies are of the tight fit type made under pressure, which implies an adapted material pair: In the case of the torch presented, the assemblies are constituted by plastic—copper alloy or tungsten alloy—copper alloy pairs.

Other material pairs are conceivable, in particular ceramic materials could replace the plastic materials, if a vibrator were to be interposed, in a known way, between the pressure head and the assembly press jack.

Figure 11:
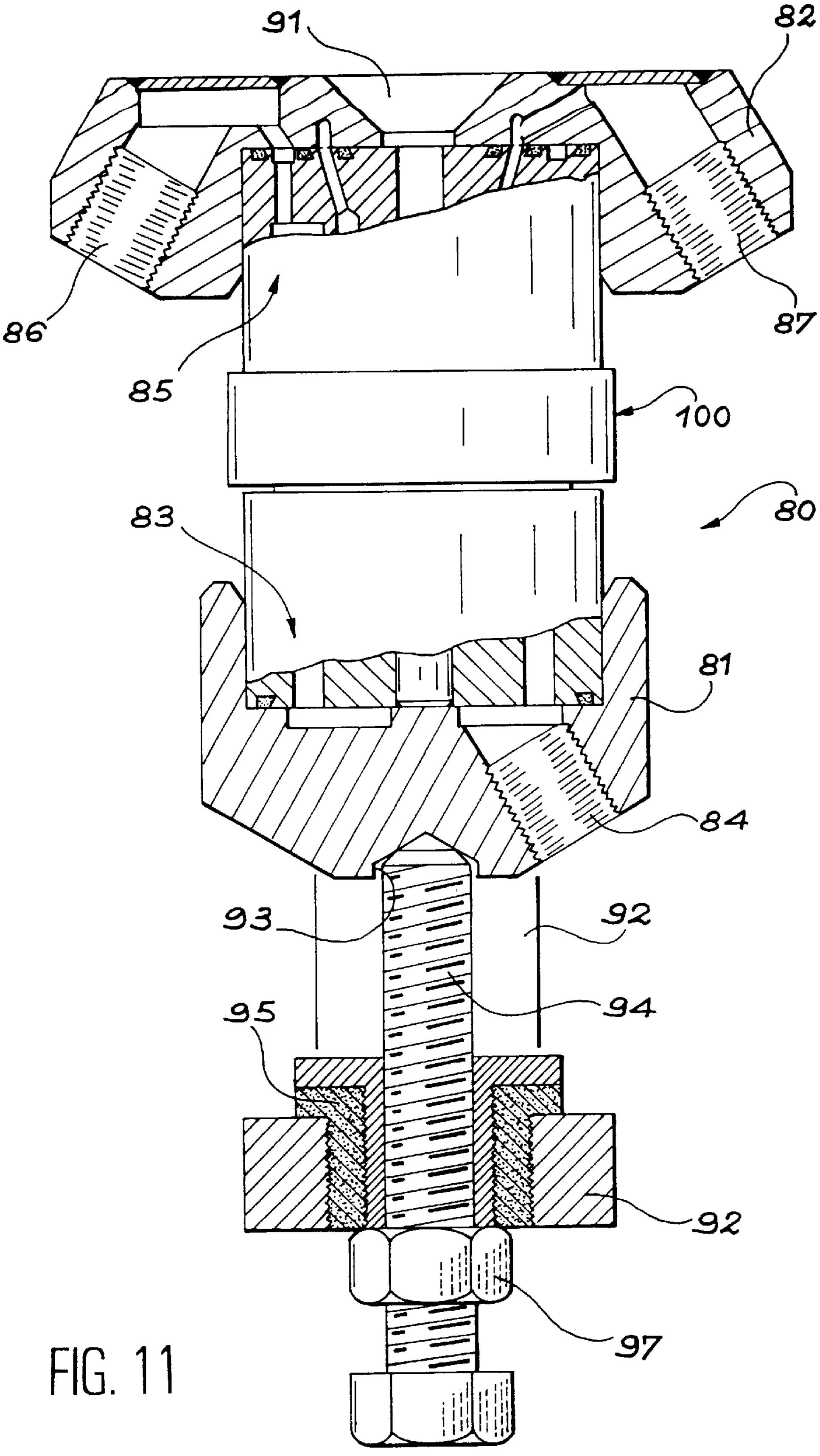
FIG. 11 shows an axial cross-section along a plane perpendicular to the plane in FIG. 12 of a cartridge connecting and holding structure according to the invention assembled with a said cartridge shown diagrammatically.
Figure 12:
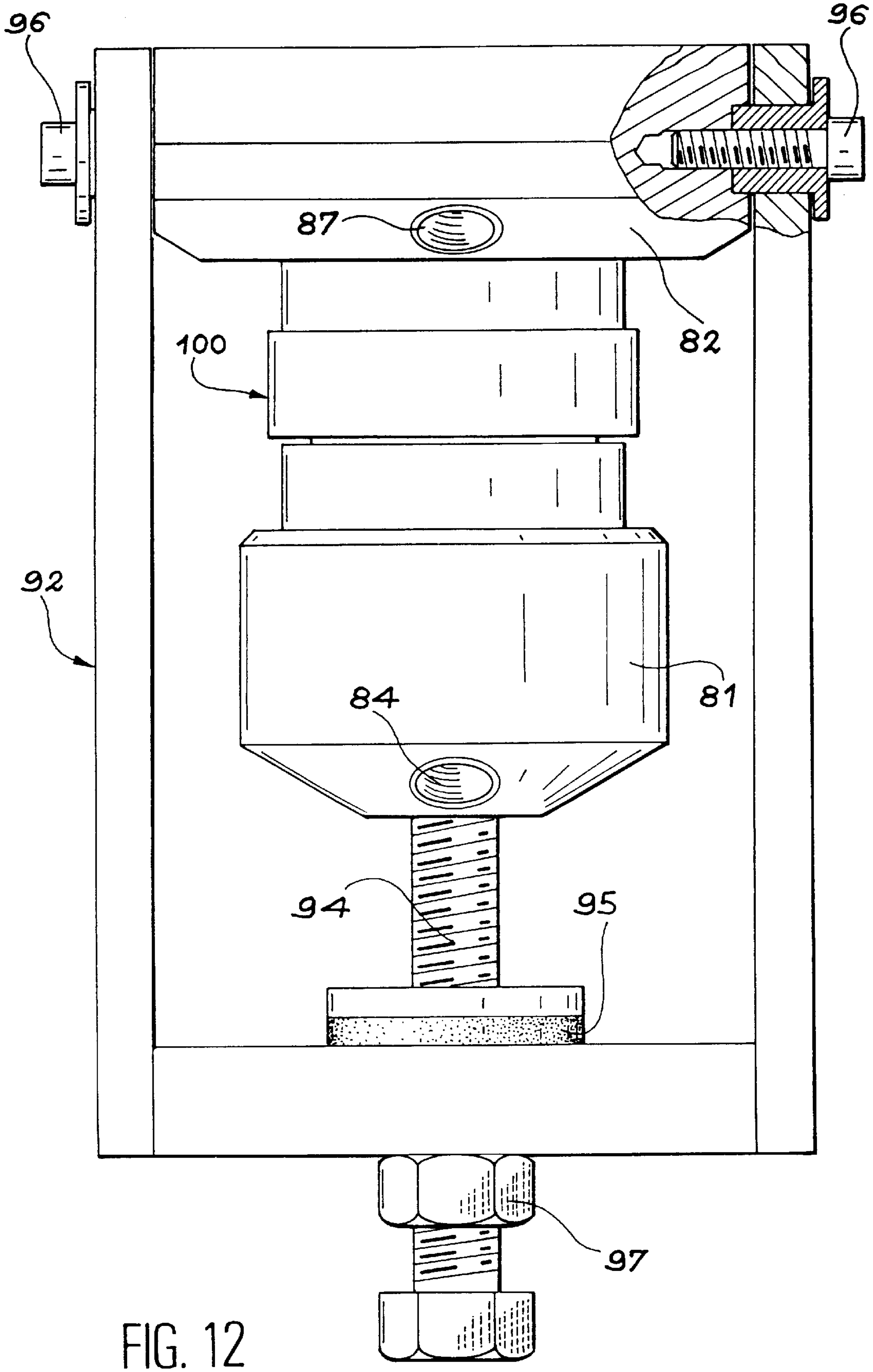
FIG. 12 is a front view of the structure 80 assembled with the cartridge 100, with a partial axial cross-section in the upper right hand corner.

The connecting and holding structure of the cartridge 100 will now be briefly described in conjunction with FIGS. 11 and 12. The connecting and holding structure 80 comprises two end plates 81, 82, both of revolution around the axis AA'. A lower end plate 81 conceals a bore 83 the inner diameter of which is equal to the outer diameter of the support 2, in such a way that this support 2 can easily be inserted into this end plate 81. The lower end plate 81 comprises a water outflow and a current inflow shown as 84. One or more O-rings make it possible in a known way for tightness to be ensured.

The upper end plate 82 of the holding and connecting structure conceals a bore 85 the inner diameter of which is equal to the outer diameter of the anode 1, in such a way that this anode 1 can easily be inserted into this end plate 82. This end plate 82 comprises a central axial hole 91 with flared edges allowing the plasma to pass. The lower 81 and upper 82 end plates and the cartridge 100 are kept assembled by means of a stirrup piece 92. This stirrup piece 92 is U shaped. Two parallel arms of the U are fixed rotationally by means of screws 96 perpendicular to the axis AA' to the upper end plate 82. Bushes and insulating washers are provided in a known way to prevent electrical contacts between the stirrup piece and the end plate 82. The lower end plate 81 is fitted on its lower face with a central indentation 93. In the assembled position a screw 94 mounted in the horizontal part of the U of the stirrup piece 92 blocks the rotation of the stirrup piece 92 around the screws 96 and exerts a pressure in the indentation 93, preventing movement of the end plates 82 and 81 in the axial direction. Electrical insulation of the end plate 81 and of the stirrup piece is obtained by means of an insulating bush 95 and of insulating washers. A blocking locknut 97 is provided. The distance between the horizontal arm of the stirrup piece 92 and the lower face of the end plate 81 is sufficient to allow the disengagement of the cartridge 100 from the bores 83 and 85 of the end plates 81 and 82 respectively.

The operation is as follows:

To dismantle the cartridge 100 the locknut 97 is unlocked and the screw 94 unscrewed until the cartridge 100 can be extracted from one of the end plates 81 or 82. In this position the end plate 82 is still integral with the stirrup piece 92 and the end plate 81 is held in place, the screw 94 still within the indentation 93. In this position of the end plates the cartridge 100 can be extracted from the other end plate by a slight rotation of the stirrup piece 92 around the axis formed by the screws 96. This rotation releases the passage of the cartridge 100. For re-assembly the reverse procedure is instigated.

This mode of assembly is advantageous from the mechanical point of view since it allows an assembly pressure to be exerted on the end plates 81, 82 and on the cartridge 100, which is automatically axial. There is no risk of dissymmetrical pressures creating a lateral distortion constraint. It is also advantageous since it allows the cartridge 100 to be assembled and dismantled by means of a single screw without the end plates 81, 82, needing to be held in place, which is particularly advantageous when working in a glove box.

Naturally other mechanical means of fixing the cartridge 100 to the structure 80 are within the capability of the man skilled in the art.

Tightness is provided by seals and by the fact that the cartridge 100 is fitted in the bores 83, 85.

What is claimed is:

1. A cartridge (100) generating plasma for a plasma torch, having, centered on an axis AA', an anode (1) comprising a central cavity (10) formed in an annular ring (123), this cavity (10) receiving a cathode (3) centered on AA', the anode (1) and the cathode (3) providing between them an annular space for producing an arc, plasmagene gas distribution means, the distributed gas circulating in the annular space between the cathode (3) and the anode (1), cooling means comprising particularly conduits for a cooling fluid, these conduits having an inlet and an outlet, assembly means, a cartridge characterized in that it comprises a centering device (4) having an axial cavity centered tightly on the cathode (3), a lower surface (46), an upper surface (49), a lateral outer surface (38, 50), a lateral inner surface (39, 40), at least one upper part (42) of the centering device (4) being fitted inside the central cavity (10) of the anode (1), conduits (44, 144) having a first end on the lateral outer surface (5) of the centering device (4) housed in the cavity (10) of the anode, and a second end on the upper surface (49) of the upper part (42, 43) of the centering device (4), these conduits (44, 144) being into communication with conduits (127) of the anode (1).

2. A cartridge (100) according to claim 1 characterized in that the conduits (44, 144) of the centering device (4) join the outer surface (50) of the centering device (4) to an axial annular groove (45) of the centering device (4) formed between the centering device (4) and the cathode (3) by a detachment from the lateral inner surface (39) of the centering device (4), or in apertures (95), these apertures (95) emerging on the upper surface (49) of the centering device (4).

3. A cartridge (100) according to claim 1, characterized in that the conduits (44, 144) have an axial line not contained in a radial plane of the centering device (4).

4. A cartridge (100) according to claim 1, characterized in that the conduits (44, 144) have an end emerging in a radial groove (148) formed on the lateral outer surface (50) of the centering device (4).

5. A cartridge (100) according to one of the claims 1, characterized in that the conduits (44, 144) have an end emerging in a radial groove (135) of the inner cavity (10) of the anode (1).

6. A cartridge (100) according to claim 1, characterized in that the conduits (44, 144) have an end emerging in a radial groove (148) formed on the lateral outer surface of the centering device (4), this groove (148) being in communication with a radial groove (135) of the inner cavity (10) of the anode (1).

7. A cartridge (100) according to claim 1, characterized in that the conduits (127) of the anode (1) have an axial line contained in a radial plane of the central ring (123) of the anode (1) surrounding the central cavity (10) of the anode (1).

8. A cartridge (100) according to claim 1, characterized in that the centering device (4) is fitted with a lower shoulder (41) of the same outer diameter as the outer diameter of the central ring (123) of the anode (1), this shoulder having a lower surface (46) and an upper surface (47), the lower surface of this shoulder constituting the lower surface (46) of the centering device (4), and the upper surface (47) of this shoulder (41) being in contact with a lower surface (134) of the central ring (123) concealing the central cavity (10) of the anode (1).

9. A cartridge (100) according to claim 8, characterized in that a base (31) of the cathode (3) is housed in a bore (23) of a ring (29) of a support (2), this ring (29) being of the same outer diameter as the outer diameter of the central ring (123) of the anode (1), and having an upper surface (30), the lower surface (46) of the centering device (4) being in contact with an upper surface (30) of the ring (29) of the support (2).

10. A cartridge (100) according to claim 9, characterized in that the anode (1) comprises an annular groove (122) formed around the annular ring (123) concealing the central cavity (10) of the anode (1), in that the support (2) comprises an annular groove (24) formed around the ring (29) concealing the bore (23) housing the base (31) of the cathode (3), the annular grooves (122) formed around the annular ring (123) and annular (24) formed around the ring (29) concealing the bore (23) housing the base (31) of the cathode (3), having the same outer diameter and in that an assembler (5) having an inner axial cavity (69) comprises a lower annular ring (51) tightly fitted in said annular groove (24) of the support (2) and an upper annular ring (56) tightly fitted in said annular groove (122) of the anode (1), the diameter of the inner axial cavity (69) of the assembler being greater than the diameter of the annular ring (123) of the anode (1) in such a way that a first annular volume (72) is provided between the anode (1) the centering device (4) and the support (2) and the assembler (5), said annular volume (72) being in communication by means of conduits (130, 28) of the support (2), and of the anode (1), with the outer surface (21, 36, 11, 19) of the support (2) and of the anode (1).

11. A cartridge (100) according to claim 10, characterized in that in the assembled position an upper surface (60) of the upper ring (56) of the assembler (5) is not stopped on a bottom (124) of the annular groove (122) of the anode (1), in such a way that a second annular volume (71) is provided between this upper surface (60) and the groove bottom (124), one (130) of the conduits communicating with the outside emerging in this volume (71).

12. A cartridge (100) according to claim 11, characterized in that in the assembled position a lower surface (59) of the lower ring (51) of the assembler (5) is not stopped on a bottom (27) of the annular groove (24) of the support (2), in such a way that a third annular volume (73) is provided between this lower surface (59) and the groove (24) bottom (27) one of the conduits communicating with the outside emerging in this volume (73).

13. A plasma torch, characterized in that it comprises a structure (80) for connecting and holding in place a cartridge (100) for a plasma torch according to claim 1, this structure having an upper end plate (82) comprising a bore (83) for receiving the anode (1) of the cartridge, a central axial hole (91) the diameter of which is equal to or greater than the diameter of an upper part (13) of the central cavity (10) of the anode (1), and a lower end plate (81) comprising a bore (83) for receiving a support (2) of the cartridge, the structure having means (92, 96, 94) of fixing the cartridge (100) and carrying inlets (86, 87) for a cooling fluid, plasmagene gas, and means (84) of draining the cooling fluid these means positioning themselves, when the cartridge (100) is assembled in the structure (80), opposite the corresponding conduits (127, 130) of the cartridge (100).

14. A plasma torch according to claim 13, characterized in that the means of fixing to the cartridge (100) the fixing and holding structure (80) comprises a stirrup piece (92) fixed rotationally to the upper end plate (82) of the structure (80) comprising the bore (85) for receiving the anode (1) of the cartridge, a screw (94) mounted in the stirrup piece (92) acting as support on the lower end plate (81) of the structure (80) comprising the bore (83) for receiving the support (2) of the cartridge (100).

15. A cartridge (100) according to claim 2, characterized in that the conduits (44, 144) have an axial line not contained in a radial plane of the centering device (4).

16. A cartridge (100) according to claim 3, characterized in that conduits (44, 144) have an end emerging in a radial groove (148) formed on the lateral outer surface (50) of the centering device (4).

17. A cartridge (100) according to claim 3, characterized in that the conduits (44, 144) have an end emerging in a radial groove (135) of the inner cavity (10) of the anode (1).

18. A cartridge (100) according to claim 3, characterized in that the conduits (44, 144) have an end emerging in a radial groove (148) formed on the lateral outer surface of the centering device (4), this groove (148) being in communication with a radial groove (135) of the inner cavity (10) of the anode (1).

19. A cartridge (100) according to claim 6, characterized in that the conduits (127) of the anode (1) have an axial line contained in a radial plane of the central ring (123) of the anode (1) surrounding the central cavity (910) of the anode (1).

20. A cartridge (100) according to claim 7, characterized in that the centering device (4) is fitted with a lower shoulder (41) of the same outer diameter as the outer diameter of the central ring (123) of the anode (1), this shoulder having a lower surface (46) and an upper surface (47), the lower surface of this shoulder constituting the lower surface (46) of the centering device (4), and the upper surface (47) of this shoulder (41) being in contact with a lower surface (134) of the central ring (123) concealing the central cavity (10) of the anode (1).

21. A plasma torch, characterized in that it comprises a structure (80) for connecting and holding in place a cartridge (100) for a plasma torch according to claim 12, this structure having an upper end plate (82) comprising a bore (83) for receiving the anode (1) of the cartridge, a central axial hole (91) the diameter of which is equal to or greater than the diameter of an upper part (13) of the central cavity (10) of the anode (1), and a lower end plate (81) comprising a bore (83) for receiving a support (2) of the cartridge, the structure having means (92, 96, 94) of fixing the cartridge (100) and carrying inlets (86, 87) for a cooling fluid, plasmagene gas, and means (84) of draining the cooling fluid these means positioning themselves, when the cartridge (100) is assembled in the structure (80), opposite the corresponding conduits (127, 130) of the cartridge (100).

* * * * *